UNITED STATES PATENT OFFICE.

ISIDOR KITSEE, OF PHILADELPHIA, PENNSYLVANIA.

TREATING METAL-CARRYING ORES.

1,082,596.          Specification of Letters Patent.          Patented Dec. 30, 1913.

No Drawing. Application filed August 14, 1908, Serial No. 448,488. Renewed April 2, 1912. Serial No. 688,032.

*To all whom it may concern:*

Be it known that I, ISIDOR KITSEE, citizen of the United States, residing at Philadelphia, in the county of Philadelphia and State of Pennsylvania, have invented certain new and useful Improvements in Treating Metal-Carrying Ores, of which the following is a specification.

My invention relates to an improvement in the treating of metal carrying ores, and has more special reference to ores carrying noble metals, such as gold and silver.

To-day the ore is crushed and pulverized and a concentrate made thereof. This concentrate is treated with a solution containing the material to leach out the precious metal. In some cases the liquor contains a cyanid and in some cases the liquor contains a free chlorin and nitrogen compound. I have found that to hasten the leaching out process, it is advantageous to make out of the tank, in which the concentrate with its liquor is placed, an electrolytic apparatus.

It is not my purpose to send currents of electricity through in a manner so as to deposit the leached out metal on the anode; it is only necessary to send currents of electricity through for the purpose of making the re-agents more active.

In my experiments I only used the current for about one-half hour, and left after that time the concentrate in the solution. It is best to send the electric energy through this apparatus at a time when the concentrate is placed in the liquor, and should it be required, these currents of electricity may be applied to the apparatus from time to time, say every two hours or so, for a few minutes at a time.

The purpose of the electric current is not, as said above, to plate the dissolved metal, because this current is only applied during the time that the reaction of the solvent takes place and this electric current is only sent through for the purpose of accelerating this action.

In some of my experiments I used alternating current with great success, and careful investigation has proven its adaptability for the purpose in question.

Having now described my invention, what I claim as new and desire to secure by Letters Patent is:—

1. The process of accelerating the action of a cyanid solution on metal carrying ore which consists in applying for comparatively short periods currents of electricity to said liquor.

2. In the cyanid process, the step, which consists in transmitting periodically currents of electricity through the cyanid solution during the time that the same is in contact with the ore carrying the precious metal.

3. The process of increasing the efficiency of a liquor adapted to dissolve, without further aid, precious metals from their ores, which consists in sending, at different intervals, currents of electricity through said liquor during the time of leaching out the metal from its ore.

In testimony whereof I affix my signature in presence of two witnesses.

ISIDOR KITSEE.

Witnesses:
     EDITH R. STILLEY,
     ALVAH RITTENHOUSE.

---

Copies of this patent may be obtained for five cents each, by addressing the "Commissioner of Patents, Washington, D. C."